No. 807,842. PATENTED DEC. 19, 1905.
C. MATHEWS.
DEVICE FOR PREVENTING ACCIDENTS.
APPLICATION FILED JULY 21, 1905.
2 SHEETS—SHEET 1.
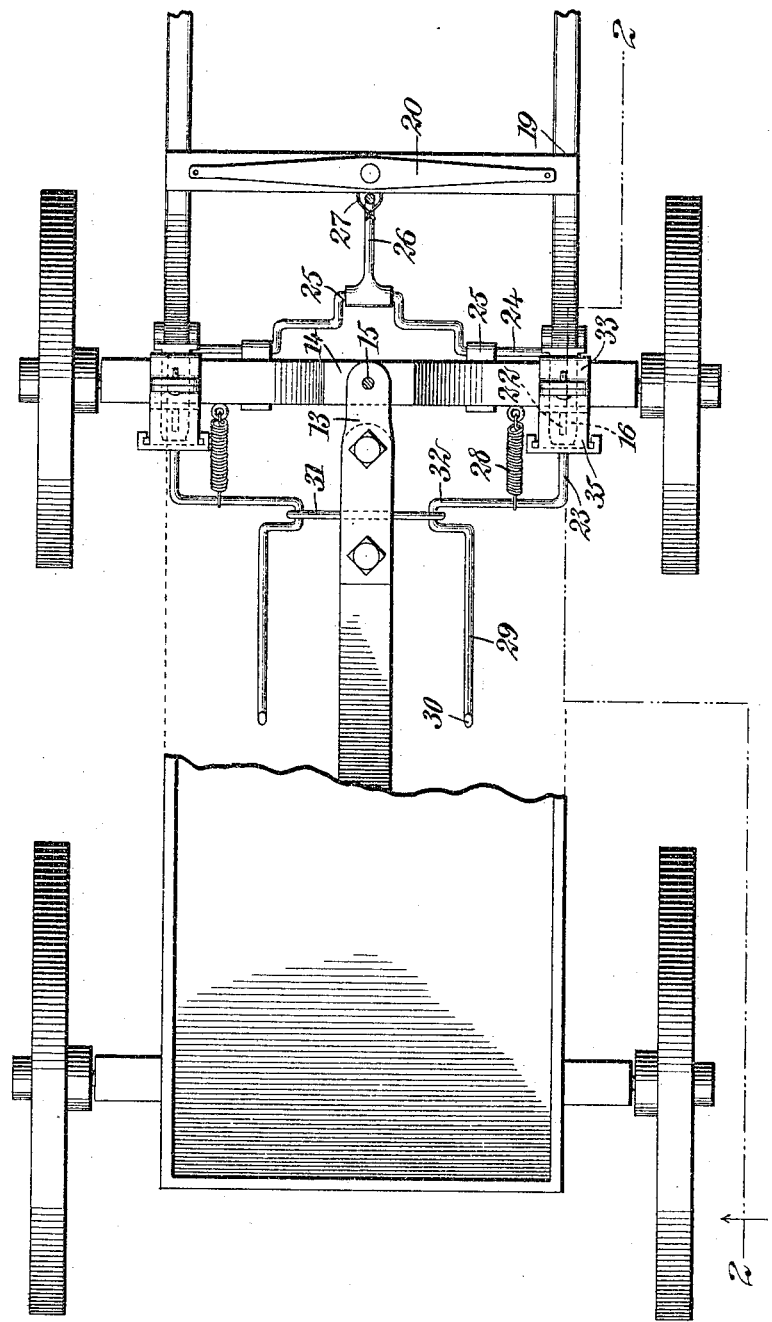
WITNESSES:
W. C. Abbott
A. E. Fay.
INVENTOR
Camil Mathews
BY
ATTORNEYS

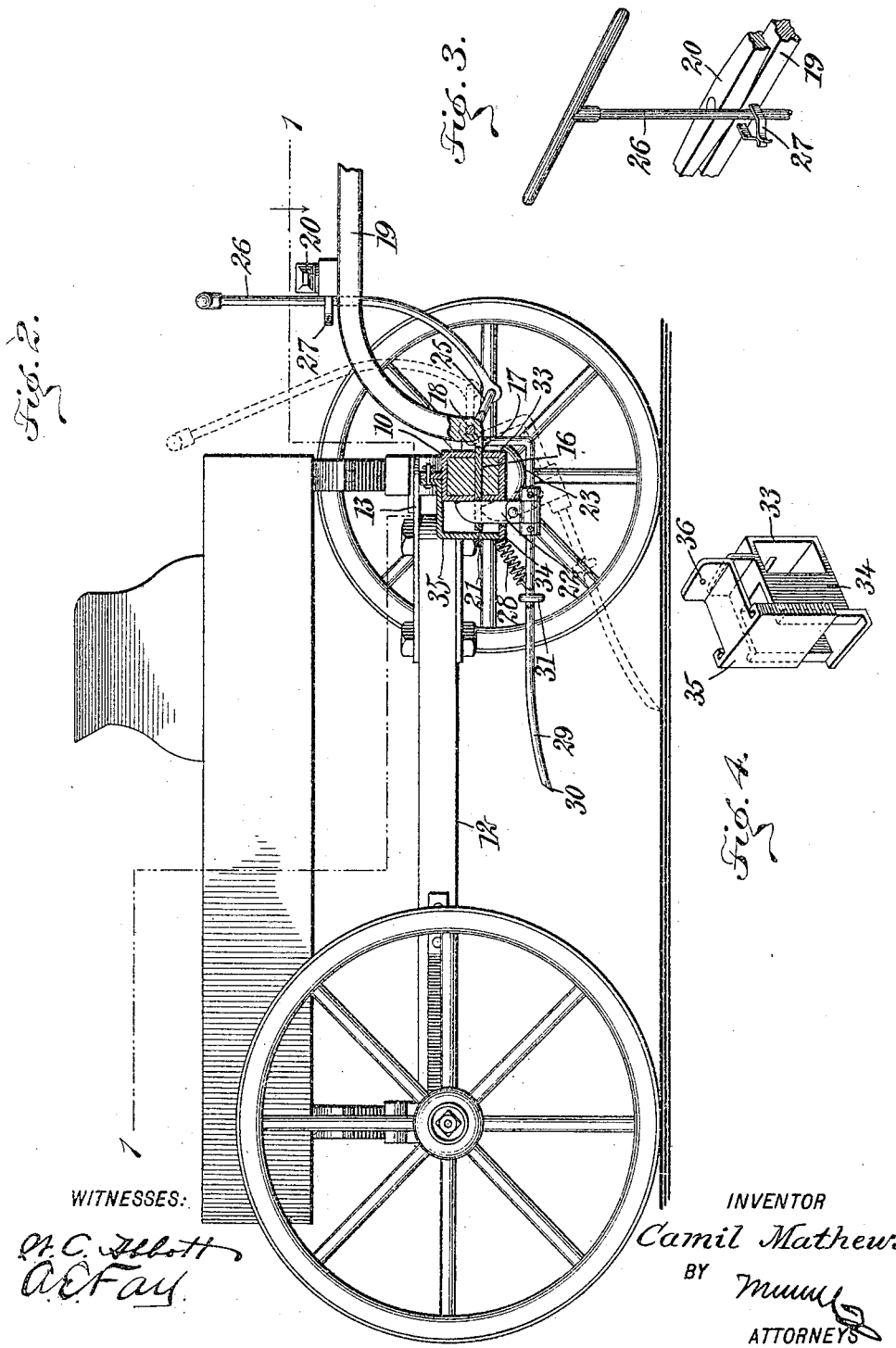

UNITED STATES PATENT OFFICE.

CAMIL MATHEWS, OF COALMONT, INDIANA.

DEVICE FOR PREVENTING ACCIDENTS.

No. 807,842. Specification of Letters Patent. Patented Dec. 19, 1905.

Application filed July 21, 1905. Serial No. 270,704.

*To all whom it may concern:*

Be it known that I, CAMIL MATHEWS, a citizen of the United States, and a resident of Coalmont, in the county of Clay and State of Indiana, have invented a new and Improved Device for Preventing Accidents, of which the following is a full, clear, and exact description.

My invention relates to a device for preventing accidents to vehicles drawn by animals.

Although it is the principal object of the invention to connect it with the above-mentioned class of vehicles, certain parts of it could be applied to self-propelled vehicles without departing from the spirit of the invention.

My principal objects are to provide means for readily and quickly detaching draft-animals from a vehicle and for simultaneously applying a brake to stop the vehicle if it is going at a high rate of speed, and at the same time to provide means for effectually guiding the vehicle after the horse is detached.

Reference is to be had to the accompanying drawings, forming a part of this specification, in which similar characters of reference indicate corresponding parts in all the figures.

Figure 1 is a plan of a portion of a vehicle-body, showing one form of my invention applied thereto shown partly in section on the line 1 1 in Fig. 1. Fig. 2 is a side elevation of the same, partly in section, substantially on the line 2 2 in Fig. 1. Fig. 3 is a perspective view of a detail, and Fig. 4 is a perspective view of a dust-guard and other details.

The device may be applied to a vehicle of any desired character, and I have shown it as attached by means of an axle 10, having a passage therethrough (not shown) and a center pole 12 passing from the rear axle to the front axle and provided with a pair of perforated tongues 13, one engaging in a slot 14 in the top of the front axle and the other passing through the passage. A pin 15 is designed to pass through the tongues and the front axle to hold these parts in position. It will be noted that the front axle is permitted to swing upon this pin as a center. The front axle is also provided with additional transverse perforations 16 upon the two sides thereof, through which pass bars 17. These bars are pivotally connected by means of pins 18 with the shafts 19 of the vehicle or with a frame which is adapted to support a pole. This frame or the shafts constitute a holder for the whiffletree 20. In order to hold the bars 17 rigidly in position upon the axle, I provide them with perforations 21, through which pass tongues 22, which are preferably pivotally mounted upon a frame 23. This frame extends to the front of the axle and is pivoted thereon by means of a straight portion 24, passing through eyes 25 upon the axle. This straight portion is provided with an offset 25$^a$, which is connected to a handle 26. This handle extends upwardly and is normally held between spring-clips 27 upon the whiffletree-holder. It will be readily obvious that the lifting of this handle by the occupants of the vehicle will oscillate the frame 23 about the portion 24 as a center and withdraw the tongues 22 from the perforations 21, so that the bars 17 will be quickly drawn away from the vehicle by the horse or horses, if they are pulling upon it. I also provide springs 28 for normally holding the frame in elevated position, so that the tongues will securely hold the whiffletree-holder and draft-animals. Upon the frame 23 and extending rearwardly therefrom is a pair of bars 29, which may have sharpened ends 30, designed to drag on the ground, as shown in dotted lines in Fig. 2, when the horses are released. This affords an efficient brake for the device. These projections are shown as being connected by a link 31, connected with offsets 32 on the projections.

The operation of the device to release the horse and apply the brake will be readily understood. It will also be seen that when the handle has been released from the clips 27, which will be done in the operation of the handle, it can be operated to turn the front axle about its pivot and steer the vehicle. In order to protect the parts above described, I have provided a bracket 33, having a casing 34 and a sliding cover 35. When this sliding cover is placed in position, a bolt is passed through perforations 36 in the parts mentioned, and these elements are effectually secured together, and the moving parts are protected from dust and dirt, as well as from rain.

Having thus described my invention, I claim as new and desire to secure by Letters Patent—

1. In a vehicle, the combination of a front axle having passages therethrough, bars extending through said passages and provided with perforations upon the rear side of the axle, and tongues passing through said perforations for holding the bars upon the axle.

2. In a vehicle, the combination of a front axle having a passage therethrough, a bar extending through said passage provided with a perforation upon the rear side of the axle, a tongue passing through said perforation for holding the bar on the axle, and means for moving the tongue to release the bar from the axle.

3. In a vehicle, the combination of an axle having a passage, a bar extending through the passage and provided with a perforation upon the rear side of the axle, a frame movably mounted upon the axle and having a tongue adapted to pass through the perforation for holding the bar on the axle, and means for moving the frame to release the bar from the axle.

4. In a vehicle, the combination of a front axle having passages therethrough, bars extending through said passages and provided with perforations upon the rear side of the axle, a frame pivotally mounted on said bars upon the front of the axle, a second frame movably mounted upon the axle and having tongues passing through said perforations for holding said bars and the axle, and means for moving said last-mentioned frame to release the bars from the axle.

5. In a vehicle, the combination of an axle having perforations, bars extending through said perforations and having perforations in their ends upon the rear side of the axle, a frame movably mounted upon said bars, a second frame movably mounted on the axle, tongues on the second frame for engaging the last-mentioned perforations and locking the bars and the axle, resilient means for holding said second frame in position for locking said bars, and means for moving the second frame out of locking position.

6. In a vehicle, the combination of a front axle having passages therethrough, bars extending through said passages and provided with perforations upon the rear side of the axle, a frame pivotally mounted on said bars upon the front of the axle, a second frame movably mounted upon the axle and having tongues passing through said perforations for holding said bars and the axle, and means for moving said last-mentioned frame to release the bars from the axle, said second frame having a brake thereon consisting of bars adapted to be moved into contact with the ground when the frame is moved into unlocking position.

7. The combination with an axle, of a bar engaging said axle, a frame supported by the bar, a second frame pivotally mounted on the front side of the axle, said frame having an offset extending to the front of the pivotal point of the frame, a handle connecting the said offset for swinging the frame about its pivot, a tongue pivotally mounted on the frame and engaging said bar, a spring connecting the rear side of the axle with a portion of the second frame which extends to the rear of the axle for holding said tongue in elevated position, and an extension on the second frame adapted to engage the ground when the frame is moved to release the tongue from said bar.

8. The combination with an axle, of a bar engaging said axle, a frame supported by the bar, a second frame pivotally mounted on the front side of the axle, said frame having an offset extending to the front of the pivotal point of the frame, a handle connecting the said offset for swinging the frame about its pivot, a tongue pivotally mounted on the second frame and engaging said bar, a spring connecting the rear side of the axle with a portion of the second frame which extends to the rear of the axle for holding said tongue in elevated position, and an extension on the second frame adapted to engage the ground when the frame is moved to release the tongue from said bar, said axle having a perforation therethrough at its center and a center-piece connected with the rear axle and having two perforated tongues, one adapted to enter said perforation and the other adapted to engage the top of the axle directly above it, and a centering-pin for connecting said center-piece and the front axle together.

9. The combination with an axle, of a bar engaging it, a frame supported by the bar, a second frame mounted on the front side of the axle and having an offset extending to the front thereof, a handle connected with the offset, a tongue mounted on the second frame and engaging said bar and an extension on the second frame adapted to engage the ground when the frame is moved to release the tongue from said bar, said axle having a perforation therethrough and a center-piece connected with the rear axle and having two perforated tongues, one adapted to enter said perforation and the other to engage the top of the axle above the perforation, and a pin for connecting said center-piece and the front axle.

10. The combination with an axle, of a bar engaging the axle, a frame supported by the bar, a second frame mounted on the front side of the axle and having an offset, a handle connected with said offset, a tongue mounted on the frame and engaging said bar, and an extension on the second frame adapted to engage the ground when the frame is moved to release the tongue from the bar.

In testimony whereof I have signed my name to this specification in the presence of two subscribing witnesses.

CAMIL MATHEWS.

Witnesses:
SMITH F. AULD,
H. C. AULD.